(12) United States Patent
Enright

(10) Patent No.: US 8,094,123 B2
(45) Date of Patent: Jan. 10, 2012

(54) CONTROLLER WITH USER-SELECTABLE DISCRETE BUTTON EMULATION

(76) Inventor: Robert Enright, Brentwood, NY (US)

( * ) Notice: Subject to any disclaimer, the term of this patent is extended or adjusted under 35 U.S.C. 154(b) by 700 days.

(21) Appl. No.: 12/233,803

(22) Filed: Sep. 19, 2008

(65) Prior Publication Data

US 2010/0073283 A1  Mar. 25, 2010

(51) Int. Cl.
*G06F 3/033* (2006.01)
*G09G 5/08* (2006.01)
(52) U.S. Cl. ........................................ 345/161; 345/156
(58) Field of Classification Search .................. 345/156, 345/161
See application file for complete search history.

(56) References Cited

U.S. PATENT DOCUMENTS

| | | | |
|---|---|---|---|
| 5,459,487 A | 10/1995 | Bouton | |
| 5,731,806 A | 3/1998 | Harrow et al. | |
| 5,923,317 A * | 7/1999 | Sayler et al. | 345/156 |
| 6,989,818 B2 | 1/2006 | Biheller et al. | |
| 7,038,667 B1 | 5/2006 | Vassallo et al. | |
| 7,233,313 B2 | 6/2007 | Levin et al. | |
| 7,297,061 B2 | 11/2007 | Siegel | |
| 7,405,729 B2 | 7/2008 | Gregorio et al. | |
| 2003/0038781 A1 | 2/2003 | Hsu | |
| 2006/0205507 A1 | 9/2006 | Ho | |

* cited by examiner

*Primary Examiner* — Quan-Zhen Wang
*Assistant Examiner* — Nelson D Runkle, III
(74) *Attorney, Agent, or Firm* — Barkume & Associates, P.C.

(57) ABSTRACT

A user device with a position control device such as a thumbstick may be used to emulate discrete button presses via user selection of a mode switch on the device.

20 Claims, 8 Drawing Sheets

CONTROLLER WITH USER-SELECTABLE DISCRETE BUTTON EMULATION

TECHNICAL FIELD

This invention relates to input controller devices such as video game controllers and the like, and in particular to a system and method for implementing a user-selectable button emulation mode wherein the position data from a thumbstick or the like may be interpreted as presses of a discrete button.

BACKGROUND OF THE INVENTION

As electronic devices become more complex, with a growing list of functions, the associated user input devices have become more complex and harder to use. Looking for the correct button to implement a desired function has become a difficult task, and when coupled with a need for speedy inputs (such as gaming), it has become an intimidating task for the user to move their finger from one button to next desired button. In addition, video equipment such as playback devices and set-top boxes have controllers that are clogged with small buttons placed close together, making it difficult to find and press only the desired button.

In addition, in the video gaming field, game controllers such as an XBOX360 controller include a position control device, such as a thumbstick, that enables the user to direct the gaming application to move a character in a desired direction or to control a camera view angle. The user normally will manipulate the thumbstick as desired during game play, but then may need to depress one or more of several available discrete buttons in order to perform additional desired functions, such as having the character jump or kick. Moving the finger from the thumbstick to a button on the controller and then back to the thumbstick is a difficult task for many users, especially novice users.

In addition, many applications such as video games will require the user to select two buttons at the same time in order to generate a certain function. That is, in order to generate a first function the user must press button X, in order to generate a second function the user must press button Y, and in order to generate a third function the user must press buttons X and Y simultaneously. This is also a difficult task for many users, especially since it requires taking the finger off of the thumbstick and positioning the thumb over the control button without looking away from the game display.

It is therefore desired to provide a user-operated controller device that can allow a user to easily select discrete button commands on the controller without looking at the buttons or having to move his finger off of the thumbstick or other type of position control device.

It is also desired to provide a user-operated controller device that can allow a user to easily select button commands on the controller that would otherwise require simultaneous selection of more than one button.

It is further desired to provide a user-operated controller device that can allow a user to easily select additional button commands on the controller in addition to those assigned to existing buttons on the controller (i.e. to provide new additional options).

It is also desired to assist memorization of commands for in-game actions by relating those actions to specific pointer/thumb movements. For example, swinging a bat could be activated by sweeping the position control pointer through multiple sections as defined by the application.

DISCLOSURE OF THE INVENTION

The present invention accomplishes these objectives by selectively using the positional data from a position control device (such as a thumbstick) to mimic or emulate existing physical input buttons or to add functionality without having to provide additional buttons. Positional data, typically X and Y coordinates, are used to define a point on a plane. Multiple X, Y data sets are typically used to determine movement of that point on the plane defined by the physical movement range of the X-Y input device. These movement data sets are then output to the controlled device (such as a gaming console or a personal computer).

This invention will allow the plane defined by the movement area of the position control input devices to be divided logically into various regions, and to assign a unique output value to each section. If the physical movement range of the X-Y input device defines a circular plane, then multiple wedge-shaped regions of that circular plane would be defined by their X,Y values. The present invention reinterprets X,Y input data to determine which assigned discrete button value should be output to the controlled device.

Thus, by defining regions of the plane as discrete buttons, the need to remove a finger from one button and move it to the next is eliminated. If desired, the cost and size of the input device can also be reduced with the elimination of each button that is now assigned to a section of the plane defined by the X-Y input devices physical movement range.

The user is able to select between a position mode, for which the positional data from the position control device is interpreted as position data as in the prior art, and a discrete mode, for which the positional data from the position control device is interpreted as discrete button press information as described herein.

Accordingly, the present invention in a first embodiment is a device that includes a housing and a user-controllable mode switch connected to the housing enabling a user to select a position mode or a discrete mode. A position control device (such as a thumbstick or trackball) is also connected to the housing, and it is manipulatable by a user to provide position coordinate data that varies in accordance with a position of the position control device (such as X-Y coordinate data). Processing circuitry is coupled to the mode switch and the position control device, and is adapted to determine if a user has selected the position mode or the discrete mode. When the mode switch is in the position mode, the position coordinate data is output as a function of the position of the position control device. When the mode switch is in the discrete mode, at least one discrete signal may be output as a function of the position of the position control device.

The position control device may be adapted to track manipulation thereof by a user over a predefined coverage area, wherein the coverage area is logically divided into a plurality of regions, and wherein each discrete signal is associated with one of the regions, such that manipulation of the position control device into a region will cause the processing circuitry to output the discrete signal associated with that region when the mode switch is in the discrete mode. The output of a discrete signal may emulate a single button selection by the user, or it may emulate a dual button selection by the user, or any other function as defined by the application program.

A plurality of buttons may also be connected to the housing and coupled to the processing circuitry, wherein selection by the user of a button will cause the processing circuitry to output a discrete signal associated with that button, and further when the mode switch is in the discrete mode, a discrete signal output by the processing circuitry as a function of the position of the position control device emulates the selection by the user of an associated button. The housing may be a user input or control device such as, but not limited to, a video game controller, a computer mouse, or a gyroscopic control device.

In a second embodiment of the invention, a system is provided that includes a user device and a host computing device interconnectable with the user device. The user device includes a housing, a user-controllable mode switch connected to the housing, and a position control device connected to the housing. The mode switch outputs a mode signal that indicates if a user has selected a position mode or a discrete mode. The position control device is manipulatable by a user to provide position coordinate data that varies in accordance with a position of the position control device. The user device also has means for transmitting the mode signal and the position coordinate data to a host computing device, which may for example be a wireless or a wired connection. The host computing device includes means for receiving the mode signal and the position coordinate data from the user device, and processing circuitry that is adapted to determine if a user has selected the position mode or the discrete mode based on the mode signal. When the mode signal indicates that the mode switch is in the position mode, then the position coordinate data is processed as a function of the position of the position control device. When, however, the mode signal indicates that the mode switch is in the discrete mode, then the position coordinate data is processed as at least one discrete signal as a function of the position of the position control device.

In a third embodiment of the invention, an integrated hand-holdable computing system is provided, that includes a housing, a user-controllable mode switch connected to the housing, a position control device connected to the housing, and processing circuitry. Optionally a display and/or speakers are provided. The mode switch outputs a mode signal that indicates if a user has selected a position mode or a discrete mode. The position control device is manipulatable by a user to provide position coordinate data that varies in accordance with a position of the position control device. The processing circuitry is adapted to determine if a user has selected the position mode or the discrete mode based on the mode signal. When the mode signal indicates that the mode switch is in the position mode, then the position coordinate data is processed as a function of the position of the position control device. When, however, the mode signal indicates that the mode switch is in the discrete mode, then the position coordinate data is processed as at least one discrete signal as a function of the position of the position control device.

Provided also is a method of operating a device by enabling a user to operate a mode switch in order to select a position mode or a discrete mode, enabling the user to manipulate a position control device to provide position coordinate data that varies in accordance with a position of the position control device, and determining if the mode switch is in the position mode or the discrete mode. If the mode switch is in the position mode, then the position coordinate data is processed as a function of the position of the position control device, but if the mode switch is in the discrete mode, then at least one discrete signal is processed as a function of the position of the position control device.

BEST MODE FOR CARRYING OUT THE INVENTION

Figure 1:
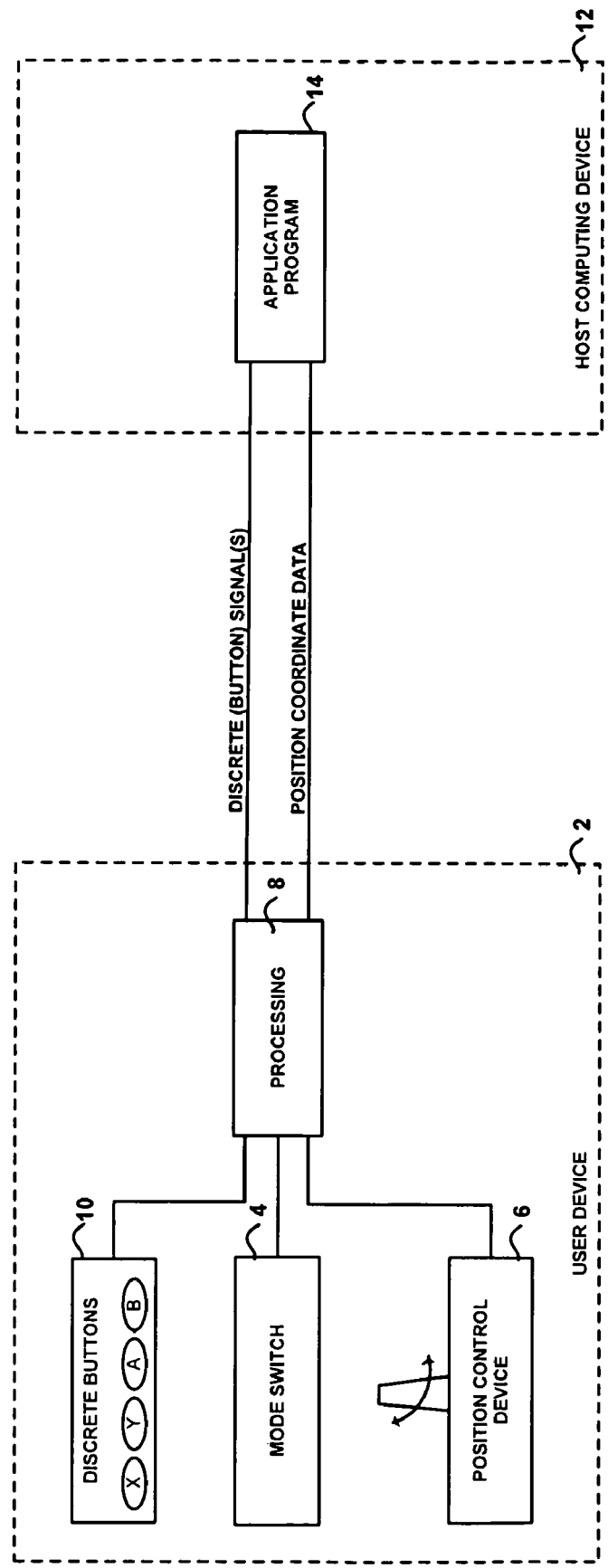
FIG. 1 is a block diagram of a first embodiment of the present invention which is implemented completely in a controller device that is separate from a host device.

The present invention may be implemented in at least any of the three embodiments that will now be described with reference to the Figures. FIG. 1 is a block diagram of a first embodiment of the present invention which is implemented completely in a user controller device 2 that is separate from a host computing device 12. For example, the user device 2 may be a video game controller (wired or wireless) and the host computing device 12 may be a gaming console such as an XBOX360 or a personal computer. The user device 2 includes a housing that has a user-controllable mode switch 4 and a position control device 6 (such as a thumbstick) connected thereto, for example at least partially on the outside of the housing so as to give a user access to control of these devices. Processing circuitry 8 and supporting memory reside in the housing, and are coupled to the mode switch 4 and the position control device 6. Optionally, a set of discrete buttons 10 (including for example, the X, Y, A and B buttons) are also provided on the housing. Other user control devices such as triggers, D-pads, and additions thumbsticks may be provided as known in the art.

The mode switch 4 is preferably a two-position switch that may be selectively set to either a position mode or a discrete mode by the user during operation. For example, the mode switch may be a momentary switch that is normally biased in the position mode, but which is then momentarily set to the discrete mode by the user when desired. One of the functions of the processing circuitry, as will be further described herein, is to detect if the mode switch 4 is in the position mode or the discrete mode. When the processing circuitry detects the position mode, it will cause the position coordinate data generated by the position control device (e.g. the X-Y data) to be transmitted to the host computing device 12 and processed by the application program 14 in a normal prior art manner. Thus, in the case wherein the host computing device 12 is a gaming console such as an XBOX360, and the user device 2 is an XBOX360 controller adapted in accordance with this invention, then the user device will send the X-Y data as generated by the position control device (thumbstick) 6 as known in the art. When, however, the user selects the discrete mode by operating the mode switch 4, then the processing circuitry will analyze the position coordinate data from the thumbstick 6 in accordance with this invention, and as a result output various discrete (button) signals to the host computing device 12. This particular methodology will be described further below. When the user re-selects the position mode (such as by letting go of the mode switch 4 if it is biased to return to the position mode), then the position control data will resume being transmitted to the host computing device as in the prior art. In this embodiment of the invention, the processing and intelligence of the invention resides in the user device 2, and the host computing device is unaware as to how the various button press signals are generated. Thus, the user device 2 of this first embodiment may be used to retrofit existing game consoles and the like without requiring adaptation to the console or gaming software executing thereon.

Figure 2:
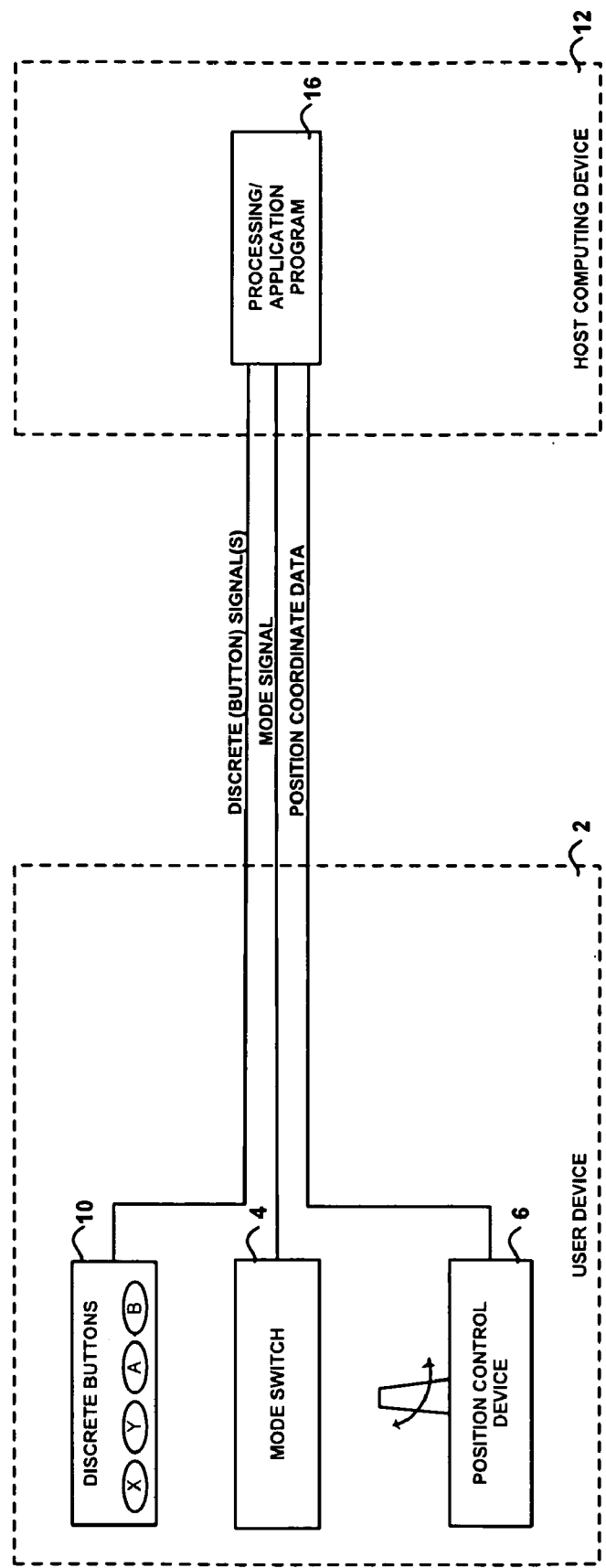
FIG. 2 is a block diagram of a second embodiment of the present invention which is implemented in a combination controller device and a separate host device.

FIG. 2 is a block diagram of a second embodiment of the present invention which is implemented in a combination controller device and a separate host device. Here, the processing and intelligence to ascertain if the position control data should be interpreted as position control data or as button presses will reside in the host computing device 12. In FIG. 2, the processing circuitry of the user device 2 is shown as omitted for purposes of this invention, although it is understood that some processing circuitry will exist in the user device 2 as known in the art. In this case, the mode signal from the mode switch 4 is transmitted along with the position coordinate data (and optional discrete data from additional hardwired buttons if desired) directly to the processing and application program 16 of the host computing device 12. Here, the transmitting means may be any know device such as a USB transmitter, bluetooth transmitter etc., and the receiving means in the host computing device may be any known compatible device such as a USB receiver, bluetooth receiver, etc. The determination of how to process the position coordinate date (i.e. as position coordinate data or as discrete button presses) will be made by the processing and application program 16. Thus, the invention in this embodiment is distributed amongst the user device 2 and the host computing device 12. It is noted that the application program itself (such as a video game program) may provide the analysis of the signal information from the user device 2, or the host operating system may be programmed accordingly and control the game software if desired.

Figure 3:
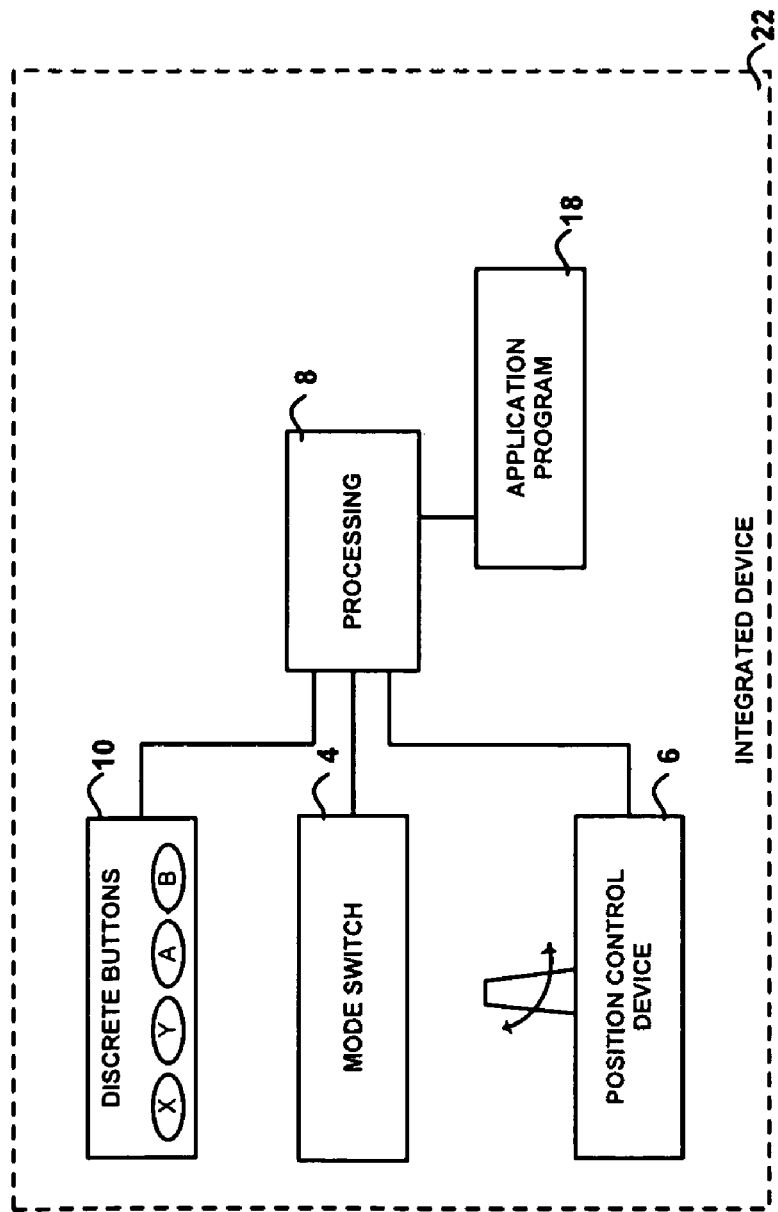
FIG. 3 is a block diagram of a third embodiment of the present invention which is implemented in an integrated hand-holdable computing system.

FIG. 3 is a block diagram of a third embodiment of the present invention which is implemented in an integrated hand-holdable computing system 22, such as a SONY PSP device. In this case, all functionality of the invention as described herein resides in the same hand-holdable housing.

Figure 4:
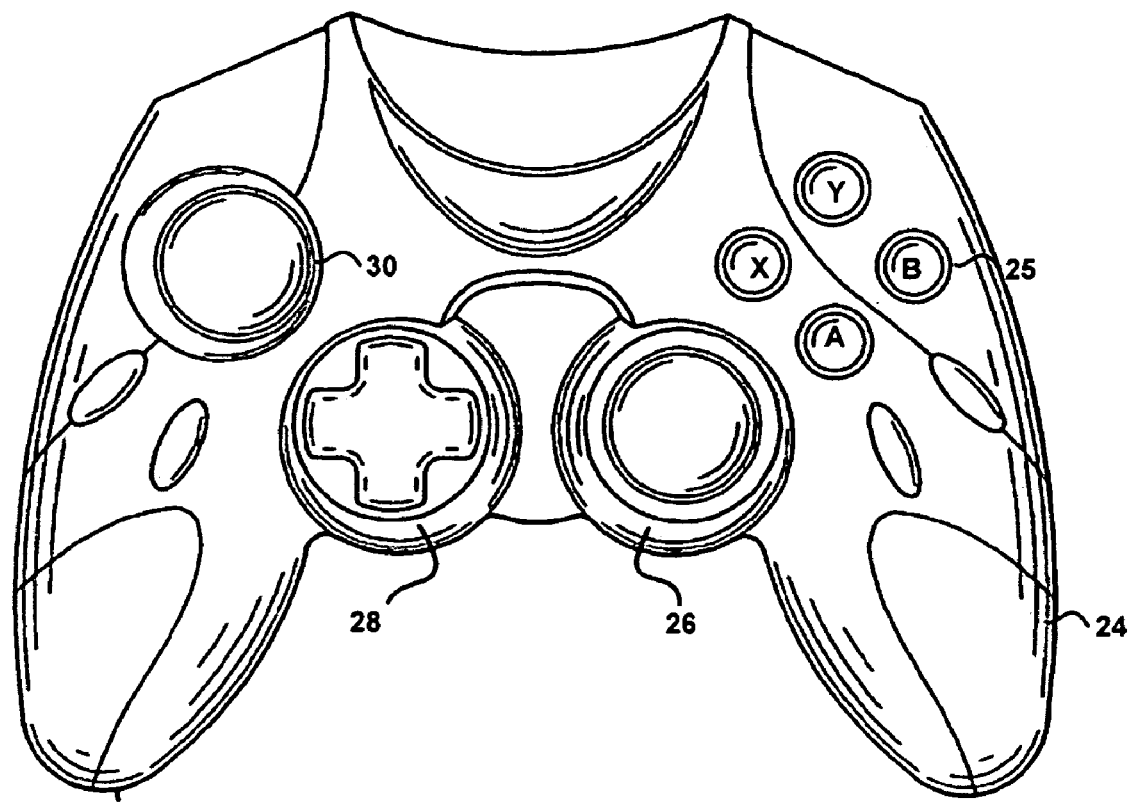
FIG. 4 shows an exemplary user device that may be utilized in accordance with the present invention.

Referring back to the first embodiment, further details of the present invention are now provided. FIG. 4 shows an exemplary user device 2 that may be utilized in accordance with the present invention. Hand-holdable housing 24 is known in the art and is easily held by a user. The housing 24 contains at least one position control device, which in this example is the right-thumb thumbstick 26. Also shown in the housing 24 is a D-pad 28, a second (left-thumb) thumbstick 30, and a set of discrete buttons which include the X, Y, A and B buttons 25. The operation of this invention may provide for the thumbstick 26 to emulate the pressing of any or all of the buttons 25 alone or in selected combination, or it may emulate additional button presses of buttons not otherwise provided on the housing. This top side of the housing 24 will appear to the user as any conventional game controller device as known in the art.

Figure 5:
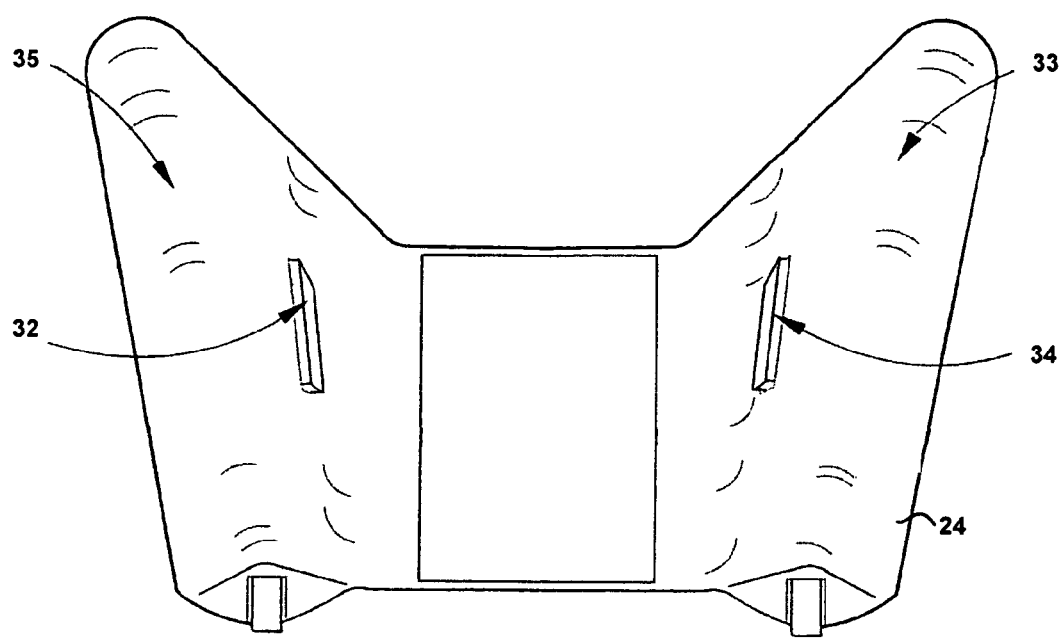
FIG. 5 illustrates the underside of the housing of the user device of FIG. 4.

FIG. 5 illustrates the underside of the housing 24, with a first mode switch 32 and a second mode switch 34 provided. These have been added in accordance with the present invention and are not found in controllers of the prior art. Two mode switches 32, 34 are shown, although only one such mode switch is required for this invention. The device may be configured such that either of the mode switches 32, 34 will change the mode of the thumbstick 26 in accordance with this invention. This will accommodate left-handed as well as right-handed users as desired. Or, if desired, one mode switch may operate in conjunction with the thumbstick 26 and the other may operate in conjunction with the thumbstick 30. Of course, it may be desired to provide only of these mode switches 32 or 34. For purposes of explanation we will refer to the mode switch 32 but the invention applies equally to the use of mode switch 34. In addition, these mode switches are shown in FIG. 5 on the underside since they will reside near the user's finger(s), which makes for easy operation of the invention. That is, the user naturally grasps the housing 24 such that one hand curls around the left grip 35 and the other hand curls around the right grip 33, making placement near the mode switches 32, 34 optimal. It is noted that the switches may be located elsewhere on the housing if ergonomically desired.

Figure 6:
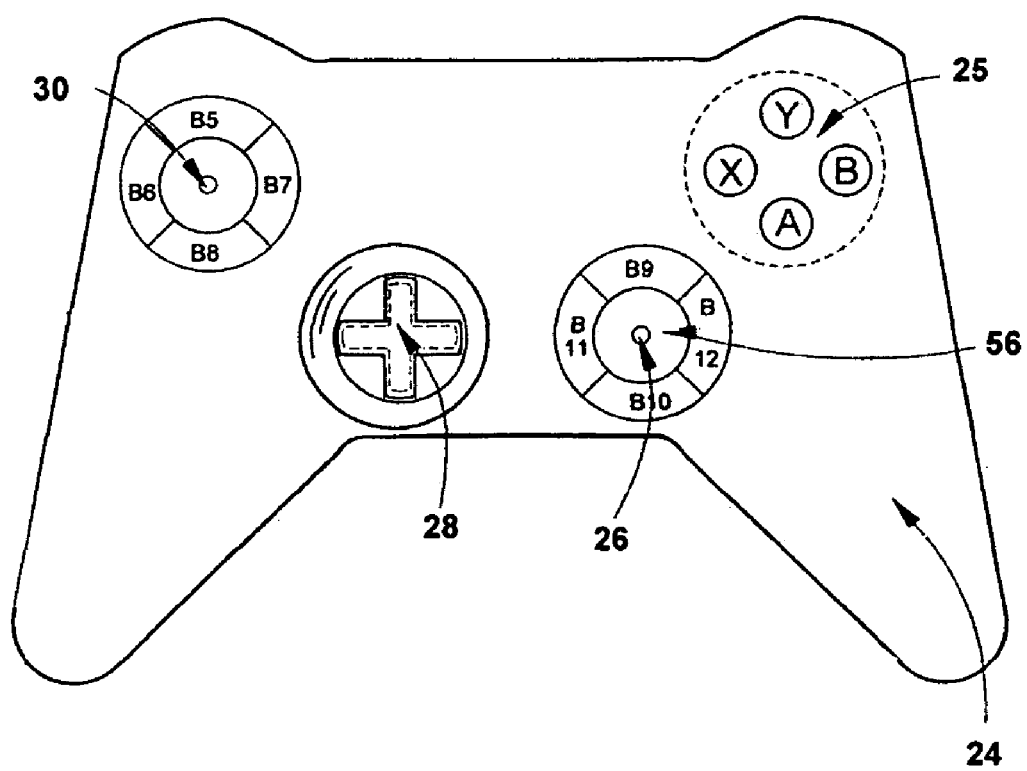
FIG. 6 illustrates the housing of the user device of FIG. 4, with the thumbstick controller partially removed to illustrate the operation of the thumbstick.

FIG. 6 illustrates the housing 24 of FIG. 4, with the cap of thumbstick controllers 26 and 30 partially removed to illustrate the operation of the thumbstick. As can be seen, the thumbstick may be manipulated in two degrees of freedom, that is, in the X-Y plane. In the position mode (the normal prior art mode), the manipulation of the thumbstick by the user will provide a set of X-Y coordinates that indicate the relative location of the thumbstick. So, if the user is controlling the movement of a character in a video game with the thumbstick, he may push the thumbstick all the way to the left to get the character to go the left. Similarly, he may have the character go partially to the left and partially forward by moving the thumbstick accordingly. Thumbstick technologies (or any position control technology) are well known the art and need not be discussed further herein; suffice it to state that X-Y coordinate data is generated by movement of the thumbstick from the center (quiescent or null) position.

Figure 7A:
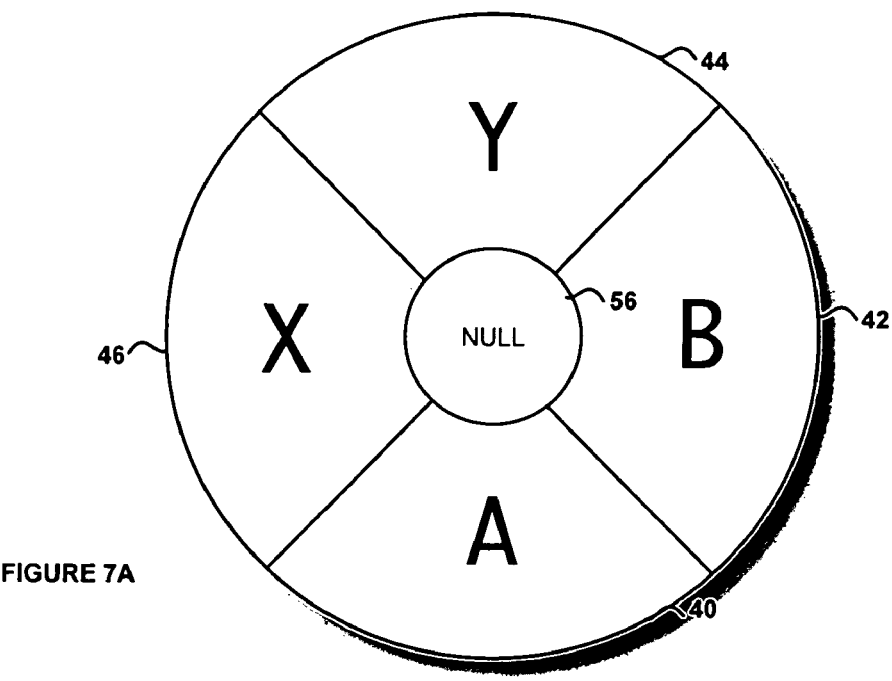
FIG. 7A illustrates implementation of a four-region position control device.
Figure 7B:
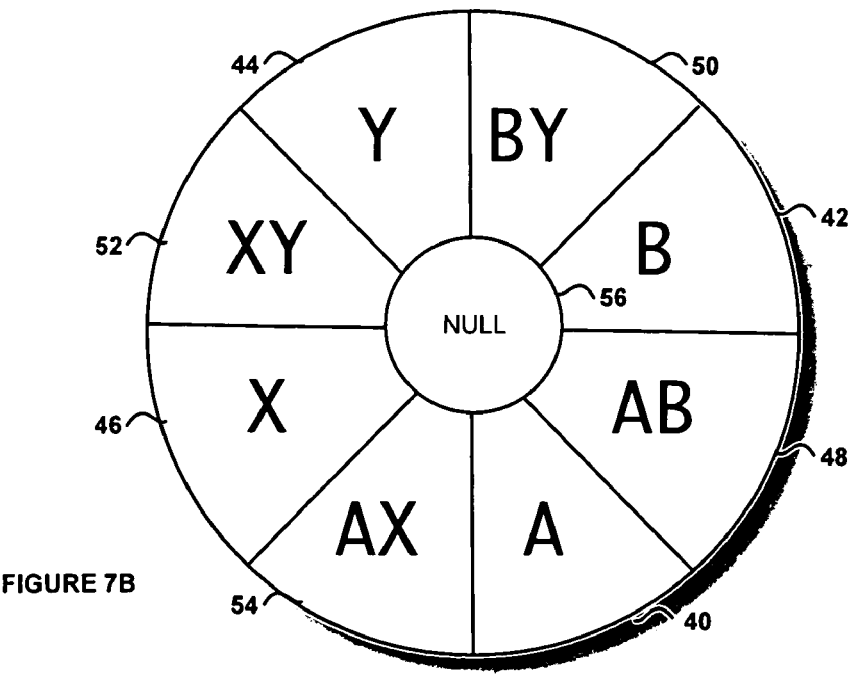
FIG. 7B illustrates implementation of an eight-region position control device.

When the user selects the mode switch 32 to be in the discrete mode, however, then the processing circuitry will interpret the position control data (the X-Y data) from the thumbstick to generate discrete signals indicative of associated button presses. FIGS. 7A and 7B illustrate the coverage area of the thumbstick in this embodiment. In this case, the area is logically divided into four regions (FIG. 7A) or into eight regions (FIG. 7B). In both instances an additional null region 56 is provided in the center. Referring to FIG. 7A, when the user manipulates the thumbstick to be anywhere in region 40, then a discrete signal is generated by the processing circuitry 8 to indicate an associated button press by the user. In this embodiment, region 40 will cause the processing circuitry to signal that button A has been pressed by the user. Likewise, when the user manipulates the thumbstick to be anywhere in region 42, then a discrete signal is generated by the processing circuitry 8 to indicate that associated button press B has been made by the user; when the user manipulates the thumbstick to be anywhere in region 44, then a discrete signal is generated by the processing circuitry 8 to indicate that associated button press Y has been made by the user; and when the user manipulates the thumbstick to be anywhere in region 46, then a discrete signal is generated by the processing circuitry 8 to indicate that associated button press X has been made by the user.

So, when in the discrete mode, the user device 2 will output discrete button signals to the host device 12 whether they were generated by actually pressing the button on the housing or by manipulating the thumbstick as described above. The application program 14 running in the host computing device 12 is unaware of how the button presses were made by the user and operates on them regardless of their origin. By using the discrete mode of the present invention, the user may quickly depress the mode switch 32, 34 when he or she desires to emulate a button press of X, Y, A or B without having to move his thumb off of the thumbstick, and then return to normal by releasing the mode switch when desired.

In the alternative to emulating button presses of pre-existing buttons X, Y, A and B (or others on the housing), the present invention may be useful to emulate button presses of new buttons that have no hardware equivalent. That is, the application software may benefit from additional button presses without having to add buttons to the housing. So, if a housing has ten buttons in hardware, the application software may be adapted to accept fourteen buttons, which would be the ten existing hardware buttons and the four new emulation buttons from implementing the present invention. For example, as shown in FIG. 6, region B9 will cause button Y to be emulated. Likewise, region B10 will cause button A to be emulated, region B11 will cause button X to be emulated, and region B12 will cause button B to be emulated. In the same manner, regions B5, B6, B7 and B8 in thumbstick 30 will optionally be associated with other discrete buttons for the device.

This invention is not limited to emulation of four buttons, and may be extended further. As shown in FIG. 7B, the coverage area of the thumbstick may be logically divided into eight distinct regions 40, 42, 44, 46, 48, 50, 52, and 54, as well as null region 56 in the center. In this example, the processing circuitry is programmed to output discrete button signals for both buttons A and B when region 48 is entered. This is useful for the situation where a user needs to make a dual-button press, such as by pressing A and B simultaneously the character will jump and kick. This can be an especially difficult move to make, and by allowing the user to select the discrete mode, and then manipulate the thumbstick into region 48, this otherwise difficult move is made much easier to implement. The same is true for region 50 (B and Y presses emulated), region 52 (X and Y presses emulated), and region 54 (A and X presses emulated). Likewise, any of these eight regions may be logically associated with any existing button or combination of buttons on the controller, or they may emulate additional buttons if desired.

The null region 56 is provided for a quiescent position in which no button press is emulated and thus no discrete signals are generated by the processing circuitry 8. When the thumbstick is in the middle quiescent position, it will reside over the null region, and no signals are generated. Once the user manipulates the thumbstick into the desired region, however, a predetermined threshold is reached and the corresponding button press(es) will be generated as described above.

The present invention may operate optionally in a single press mode or in a repeat press mode. In the single press mode, the user manipulates the thumbstick into the desired region to generate the desired button press, and must exit that region (either to the null region or another button region) and then return to generate another of the same button press. In the alternative, in the repeat press mode, a timer function is used to determine if the thumbstick remains in the region for more than a predefined time. If the thumbstick remains in that region then successive button presses are generated by the processing circuitry until the user manipulates the thumbstick to another region or to the null region 56. This is similar to a repeat mode of a keypad wherein holding a certain key down will cause successive key entries until released.

Various types of position control devices 6 may be used with this invention. There exist various types of thumbstick or joystick controllers, both of the analog and digital type, that are useful in this invention. One example of an analog joystick uses a magnet, along with four small sensors. The sensors are arranged like a compass, with one at each of the cardinal points (north, south, east, west). The base of the joystick is shaped like a ball, with tiny spokes radiating out. The ball sits in a socket above the sensors. Spikes on the socket fit between the spokes on the ball. This allows for movement without letting the joystick twist out of alignment with the sensors. As the joystick is moved, the magnet in the base moves closer to one or two of the sensors, and farther from the others. The processing circuitry monitors the changes in induction caused by the magnet's movement to calculate the position of the joystick.

In another type of analog joystick, two wheels are positioned at right angles to each other below the joystick. Whenever the joystick is moved, the two wheels turn slightly. Tiny slots are arranged around the perimeter of each wheel. The wheels are each mounted between an LED (Light Emitting Diode) and a photocell. Light from the LED, shining through the slots in the wheel on the cell, creates a small amount of current. When the amount of light changes, the level of current changes. By monitoring the output of each photo cell, the processing circuitry can determine the exact angle at which the joystick is being held.

In a further type of analog joystick, two potentiometers are positioned at right angles to each other below the joystick. Current flows constantly through each one, but the amount of current is determined by the amount of resistance. Resistance is increased or decreased based on the position of the joystick. By monitoring the output of each potentiometer, the processing circuitry can determine the exact angle at which the joystick is being held.

In addition to thumbsticks or joysticks, devices such as trackballs and computer mice may be used as a position control device in accordance with this invention. These may utilize analog technologies or digital technologies such as optical encoders, as well known in the art. For example, in a mouse embodiment, a mode switch may be provided so that the user can select the discrete mode and cause the mouse to output various discrete commands such as back and forward while in a web browser application, for example.

In addition to utilizing a two degrees of freedom (X-Y) implementation, the present invention may also work with three degrees of freedom in an X-Y-Z coordinate space. Any controller that is capable of providing X-Y-Z coordinate data may be utilized to provide associated button presses as described above. For example, certain joysticks allow the user to twist the handle around its axis (the Z-coordinate); this may be interpreted as a predefined button press as well, as envisioned by this invention.

Another device that would operate well as a position control device is a three-dimensional or gyroscopic controller that utilizes accelerometers (for example) to detect motion in space by the user, such as the WII REMOTE by NINTENDO. By implementing a mode switch as described herein, movement by the user of the WII REMOTE may be interpreted as discrete signals (button presses) as desired.

The mode switch is described above as being of the momentary type, which would be normally biased in the position mode, but it could also be normally biased in the discrete mode if desired. In this example, momentary selection of the button would cause the device to switch to the position mode and output position coordinate data. Once released, the button would return to the discrete mode.

Virtually any type of switch may be used for the mode switch if ergonomically desirable. An unbiased SPST (single pole single throw) type switch may be used in which the user must affirmatively switch from the position mode to the discrete mode and vice versa. In addition, the mode switch may be integrated with the thumbstick. For example, the user may be able to press the thumbstick down with his thumb, which would engage a switch and cause the mode to switch accordingly.

A feedback mechanism may be used to indicate to the user that he has switched modes. This may be as simple as a visual display (e.g. an LED), or a chirp of a speaker, or a rumble in a force-feedback type controller.

Figure 8:
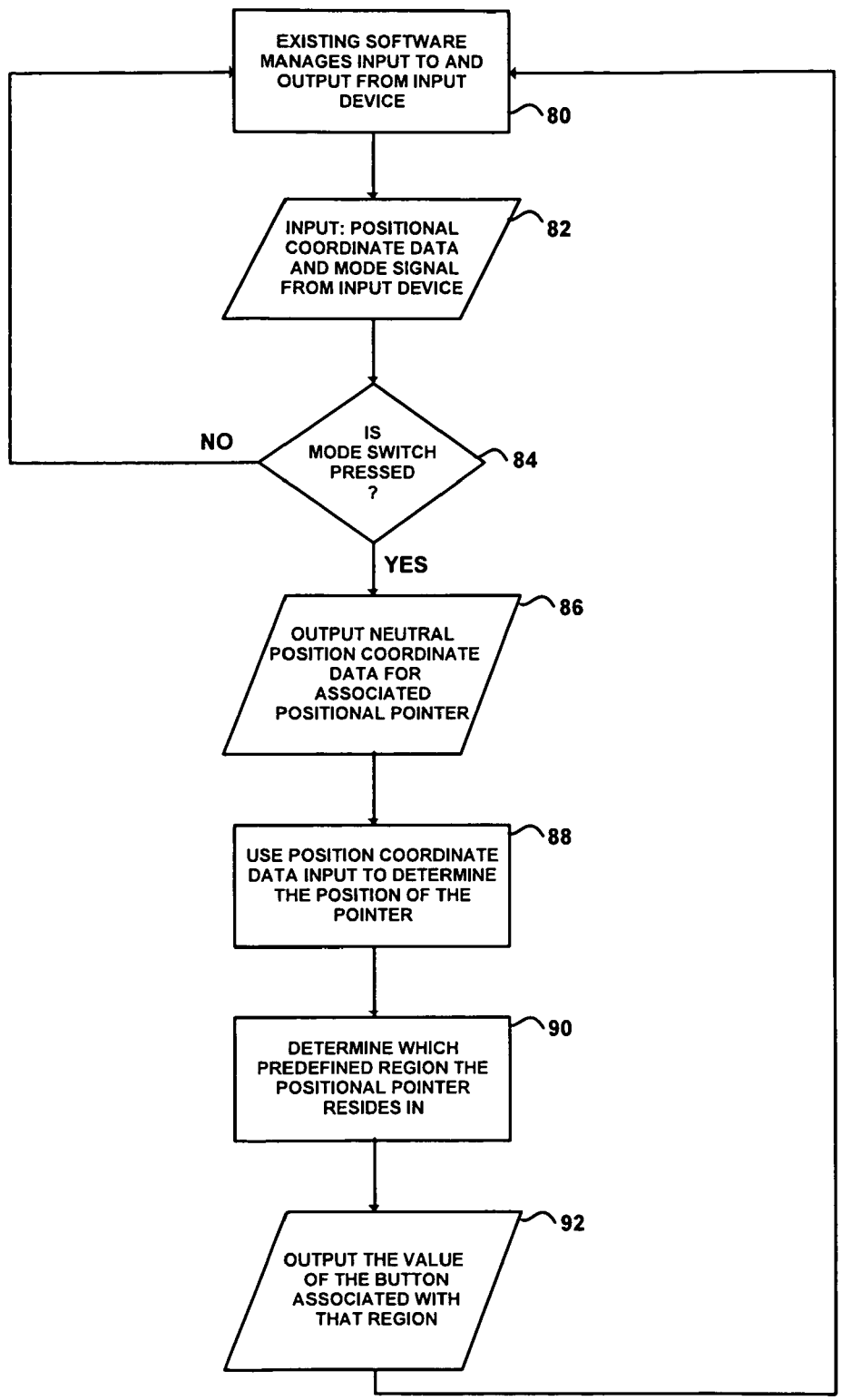
FIG. 8 illustrates a flowchart of the operation of the present invention.

FIG. 8 illustrates a basic flowchart of the operation of the present invention. In step 80, the existing software application (such as a video game) manages input to and output from the user device. In step 82, position coordinate data and the mode signal is input to the processing circuitry from the user device. In step 84, it is determined if the mode switch has been activated (pressed) by the user. If the mode switch has not been activated, then the position coordinate data is output to the application program normally. If however the mode switch has been activated so as to put the device into the discrete mode, then neutral positional data is output on the position coordinate data signals in step 86. In step 88, the position coordinate data is used by the processing circuitry to determine the position of the position control device. In step 90, the processing circuitry determines in which region the position control device resides. In step 92, the value of the discrete button associated with that region is output and used. The process then loops again from step 80 as shown in FIG. 8.

Although preferred embodiments of the invention have been described above by way of example only, it will be understood by those skilled in the art that modifications may be made to the disclosed embodiment without departing from the scope of the invention.

What is claimed is:

1. A device comprising:
 a. a housing;
 b. a user-controllable electronic momentary mode switch, biased to be normally in a position mode and momentarily selectable by a user to be in a discrete mode, connected to the housing enabling a user to select the position mode or the discrete mode in real-time during playing of a game;
 c. a position control device-connected to the housing, manipulatable by a user to provide X-Y position coordinate data that varies in accordance with a position of the position control device;
 d. processing circuitry coupled to the electronic momentary mode switch and the position control device and adapted to determine if a user has selected the position mode or the discrete mode; wherein
  i. when the electronic momentary mode switch is in the position mode, to output the X-Y position coordinate data as a function of the position of the position control device, or
  ii. when the electronic momentary mode switch is in the discrete mode, to track manipulation thereof by a user over a predefined coverage area that is logically divided into a plurality of regions, and wherein each of a plurality of discrete signals is associated with one of the regions, whereby manipulation of the position control device into a region will cause the processing circuitry to output the discrete signal associated with that region and emulate a button press by a user.

2. The device of claim 1 wherein the output of a discrete signal emulates a single button selection by the user.

3. The device of claim 1 wherein the output of a discrete signal emulates a dual button selection by the user.

4. The device of claim 1 further comprising a plurality of buttons connected to the housing and coupled to the processing circuitry, wherein selection by the user of a button will cause the processing circuitry to output a discrete signal associated with said button.

5. The device of claim 4 wherein, when the electronic momentary mode switch is in the discrete mode, a discrete signal output by the processing circuitry as a function of the position of the position control device emulates the selection by the user of an associated button.

6. The device of claim 1 in which the position control device is a thumbstick.

7. The device of claim 6 wherein manipulation of the thumbstick provides a position coordinate signal that is an analog signal.

8. The device of claim 6 wherein manipulation of the thumbstick provides a position coordinate signal that is a digital signal.

9. The device of claim 1 wherein the discrete signal is output when a predetermined threshold is reached by the position coordinate data.

10. The device of claim 1 wherein the electronic momentary mode switch is integrated with the position control device as a single switch device.

11. The device of claim 1 wherein the plurality of regions surrounds a null region whereby, when the position control device is in the null region, no discrete signal is output by the processing circuitry.

12. The device of claim 1 further comprising a feedback device to indicate which mode the electronic momentary mode switch is in.

13. The user input device of claim 1 in which the housing is a video game controller.

14. The user input device of claim 1 in which the housing is a gyroscopic controller.

15. A system comprising:
 a. a user device comprising:
  1. a housing;
  2. a user-controllable electronic momentary mode switch, biased to be normally in a position mode and momentarily selectable by a user to be in a discrete mode, connected to the housing, to output a mode signal that indicates if a user has selected the position mode or the discrete mode in real-time during playing of a game;
  3. a position control device connected to the housing, manipulatable by a user to provide X-Y position coordinate data that varies in accordance with a position of the position control device; and
  4. means for transmitting the mode signal and the position coordinate data to a host computing device; and
 b. a host computing device interconnectable with the user device comprising:
  1. means for receiving the mode signal and the position coordinate data from the user device; and
  2. processing circuitry adapted to determine if a user has selected the position mode or the discrete mode based on the mode signal; wherein
   i. when the mode signal indicates that the mode switch is in the position mode, then processing the position coordinate data as a function of the position of the position control device, or
   ii. when the mode signal indicates that the mode switch is in the discrete mode, then processing the position coordinate data as at least one discrete signal as a function of the position of the position control device.

16. An integrated hand-holdable computing system comprising:
   a. a housing;
   b. a user-controllable electronic momentary mode switch, biased to be normally in a position mode and momentarily selectable by a user to be in a discrete mode, connected to the housing, to output a mode signal that indicates if a user has temporarily selected a position mode or a discrete mode in real-time during playing of a game;
   c. a position control device connected to the housing, manipulatable by a user to provide X-Y position coordinate data that varies in accordance with a position of the position control device; and
   d. processing circuitry adapted to determine if a user has selected the position mode or the discrete mode based on the mode signal; wherein
      i. when the mode signal indicates that the mode switch is in the position mode, then processing the X-Y position coordinate data as a function of the position of the position control device, or
      ii. when the mode signal indicates that the mode switch is in the discrete mode, then processing the X-Y position coordinate data as at least one discrete signal as a function of the position of the position control device within one of a plurality of regions that together form a predefined coverage area, wherein each of a plurality of discrete signals is associated with one of the regions, whereby manipulation of the position control device into a region emulates a button press by a user.

17. A method of operating a device comprising:
   a. enabling a user to operate an electronic momentary mode switch in order to temporarily select a position mode or a discrete mode in real-time during playing of a game;
   b. enabling the user to manipulate a position control device to provide X-Y position coordinate data that varies in accordance with a position of the position control device; and
   c. determining if the mode switch is in the position mode or the discrete mode; and
      i. if the mode switch is in the position mode, then processing the X-Y position coordinate data as a function of the position of the position control device, or
      ii. if the mode switch is in the discrete mode, then tracking manipulation thereof by a user over a predefined coverage area that is logically divided into a plurality of regions, and wherein each of a plurality of discrete signals is associated with one of the regions, whereby manipulation of the position control device into a region will output the discrete signal associated with that region and emulate a button press by a user.

18. The method of claim 17 wherein the output of a discrete signal emulates a single button selection by the user.

19. The method of claim 17 wherein the output of a discrete signal emulates a dual button selection by the user.

20. The method of claim 17 wherein the discrete signal is output when a predetermined threshold is reached by the position coordinate data.

* * * * *